United States Patent
Sheeran et al.

(10) Patent No.: US 8,508,083 B2
(45) Date of Patent: Aug. 13, 2013

(54) COOLING TOWER MOTOR HAVING IMPROVED MOISTURE PROTECTION

(75) Inventors: Kent A. Sheeran, Festus, MO (US); Charles J. Roessler, St. Louis, MO (US); Ralph D. Furmanek, Ballwin, MO (US); John H. Hussey, St. Louis, MO (US)

(73) Assignee: Nidec Motor Corporation, St. Louis, MO (US)

( * ) Notice: Subject to any disclaimer, the term of this patent is extended or adjusted under 35 U.S.C. 154(b) by 228 days.

(21) Appl. No.: 12/844,525

(22) Filed: Jul. 27, 2010

(65) Prior Publication Data
US 2012/0025646 A1    Feb. 2, 2012

(51) Int. Cl.
*H02K 5/00*    (2006.01)

(52) U.S. Cl.
USPC ............................................. 310/45

(58) Field of Classification Search
USPC ........................................ 310/43, 45
See application file for complete search history.

(56) References Cited

U.S. PATENT DOCUMENTS

| | | | | |
|---|---|---|---|---|
| 3,663,847 A | * | 5/1972 | Schaefer | 310/90 |
| 3,678,436 A | * | 7/1972 | Herdrich et al. | 335/284 |
| 4,128,527 A | * | 12/1978 | Kinjo et al. | 310/43 |
| 5,490,319 A | * | 2/1996 | Nakamura et al. | 29/596 |
| 6,639,334 B2 | * | 10/2003 | Chen et al. | 310/52 |
| 7,402,932 B2 | | 7/2008 | Applegate | |
| 7,459,817 B2 | * | 12/2008 | VanLuik et al. | 310/89 |
| 7,484,718 B2 | | 2/2009 | Facius et al. | |
| 2002/0130582 A1 | | 9/2002 | Oketani et al. | |
| 2005/0074548 A1 | | 4/2005 | Puterbaugh et al. | |
| 2005/0189834 A1 | | 9/2005 | Ikeda et al. | |
| 2007/0085426 A1 | | 4/2007 | Lee et al. | |
| 2007/0152523 A1 | | 7/2007 | Bookout | |
| 2008/0042502 A1 | * | 2/2008 | VanLuik et al. | 310/89 |
| 2009/0322169 A1 | | 12/2009 | Moody | |

OTHER PUBLICATIONS

Evapco, Inc., Motors for Cooling Towers, http://www.mrgoodtower.com/parts/motors.php, accessed Jul. 7, 2010, Evapco, Inc. (1 page).
CTM Inc., Cooling Tower Replacement Parts, http://www.coolingtowerinc.com/parts/index.html, accessed Jul. 7, 2010, CTM Inc. (7 pages).
Stark Motors, Electric Motors, http://www.indiamart.com/starkmotors/electric-motors.html#cooling-tower-motors, accessed Feb. 4, 2010, Stark Motors (9 pages).

(Continued)

*Primary Examiner* — Tran Nguyen
(74) *Attorney, Agent, or Firm* — Maginot, Moore & Beck, LLP

(57) ABSTRACT

An electrical motor has been developed having an epoxy, which encapsulates a stator winding to protect the stator winding from the humid and damp atmosphere associated with a cooling tower. The electrical motor includes a stator core, a stator winding configured about the stator core, and an epoxy encapsulating at least an end portion of the stator winding, the epoxy enabling the stator winding to be isolated from an atmosphere surrounding a fan within in a cooling tower operated by the electrical motor in which the stator core and the stator winding are positioned.

4 Claims, 8 Drawing Sheets

(56) References Cited

OTHER PUBLICATIONS

Baltimore Aircoil Company, Cooling Towers: FXT, http://www.baltimoreaircoil.com/english/products/ct/fxt/fxt_specs.html, accessed Feb. 4, 2010, Baltimore Aircoil Company (4 pages).

Elantas PDG, Inc., Epoxylite 230 Resin: Two Component Low Temperature Cure Resin, Technical Data Sheet: Secondary Insulation Impregnating Resin, Aug. 15, 2008, Rev.0, Elantas PDG, Inc. (4 pages).

International Search Report and Written Opinion of the International Searching Authority corresponding to PCT Application No. PCT/US2011/045448, ISA/KR, Korean Intellectual Property Office, Seo-gu, Daejeon, Republic of Korea, Feb. 17, 2012 (9 pages).

* cited by examiner

COOLING TOWER MOTOR HAVING IMPROVED MOISTURE PROTECTION

TECHNICAL FIELD

The apparatus and method described below relate generally to electrical motors and, more specifically, to electrical motors associated with cooling towers.

BACKGROUND

Cooling towers transfer heat from a fluid to the atmosphere through evaporation. One type of cooling tower, referred to as a mechanical draft cooling tower, provides cooled water for air conditioning, manufacturing, and power generation systems. For example, a cooling tower for use with a heating ventilation and air conditioning system ("HVAC") may receive heated water from a chiller or other HVAC unit, transfer heat from the water to the atmosphere, and return cooled water to the chiller.

FIG. 8 illustrates an exemplary cooling tower 10, which includes a housing 14, a fluid input conduit 18, a fluid output conduit 22, a basin 26, fill material 30, a motor 34, and a fan 38. The housing 14 defines an internal chamber having an airflow input 42 and an airflow output 46. The motor 34 rotates the fan 38, which draws air into the chamber through the inlet 42 and forces air out of the chamber through the outlet 46. The fluid input 18 directs heated fluid, typically water from another portion of the HVAC system, into the chamber. Nozzles 50 terminate the fluid input 18 and the heated water 54 sprays out of the nozzles and onto the fill material 30. The fill material 30 has a large total surface area to promote evaporation of the water. Typical fill material 30 may include sheets of a thin material separated by a narrow distance through which the heated water trickles downward against the airflow generated by the fan 38. A portion of the water moving through the fill material 30 evaporates and extracts heat from the fill material and the air within the chamber. The remaining portion of the water trickles through the cooled fill material and falls into the basin 26. The water collected by the basin 26 has a temperature less than the temperature of the heated water 54. The water moves from the basin 26 to the output 22, which pipes the water to other portions of the HVAC system.

Operation of the cooling tower causes the air in the chamber to become laden with moisture. In particular, the air within the chamber and the air surrounding the housing may have a relative humidity of approximately 100%. The moisture laden air may have adverse effects on some mechanical and electrical components positioned within the chamber. For example, as shown in FIG. 8, the cooling tower 10 includes the electrical motor 34 positioned within the chamber. Accordingly, the cooling tower 10 exposes the electrical motor to mist and water vapor each of which subject the motor 34 to moisture damage. In particular, the stator windings of the motor 34 may become corroded, oxidized, or otherwise damaged as a result of the extremely humid and damp operating environment of the cooling tower 10.

Methods of operating an HVAC system may also increase the risk of moisture damage to the electrical motors associated with cooling towers. Some HVAC systems include a single cooling tower with a cooling capacity equal to or exceeding a maximum required cooling capacity. These HVAC systems activate the singular cooling tower each time the system requires the effects of the cooling tower. Residual heat from the electrical motor may evaporate some of the moisture surrounding the stator winding; nonetheless, regularly exposing the motor to the damp and humid operating environment contributes to moisture damage. Other HVAC systems include numerous cooling towers, which provide a combined cooling capacity equal to or exceeding the required cooling capacity. These HVAC systems may activate only the cooling towers needed to generate the required cooling capacity, while the other cooling towers remain inactive for potentially months at a time. The electrical motors of the regularly activated cooling towers benefit from the moisture eliminating effects of the residual motor heat, but remain susceptible to moisture damage as a result of the frequent exposure to the damp and humid operating environment. The electrical motors of the infrequently utilized cooling towers, are exposed to the damp and humid operating environment generated by the regularly activated cooling towers, and may be even more susceptible to moisture damage because the electrical motors of the infrequently utilized cooling towers do not regularly benefit from the residual motor heat. Accordingly, a need continues for further developments in the area of moisture protection for the electrical motors associated with cooling towers utilized in HVAC systems.

SUMMARY

An electrical motor has been developed having an epoxy, which encapsulates a stator winding to protect the stator winding from the humid and damp atmosphere associated with a cooling tower. The electrical motor includes a stator core, a stator winding configured about the stator core, and an epoxy encapsulating at least an end portion of the stator winding, the epoxy enabling the stator winding to be isolated from an atmosphere surrounding a fan within in a cooling tower operated by the electrical motor in which the stator core and the stator winding are positioned.

A method has been developed for encapsulating a stator winding to protect the stator winding from the humid and damp atmosphere associated with a cooling tower. The method of encapsulating a stator winding of an electrical motor includes heating a stator core and a stator winding configured about the stator core, rotating the stator core and the stator winding, ejecting epoxy from a nozzle onto end portions of the rotating stator winding for a first predetermined time period to encapsulate the end portions, the end portions extending from the stator core, and installing the stator core and the stator winding within an electrical motor configured to operate a fan within a cooling tower.

DETAILED DESCRIPTION

Figure 1:
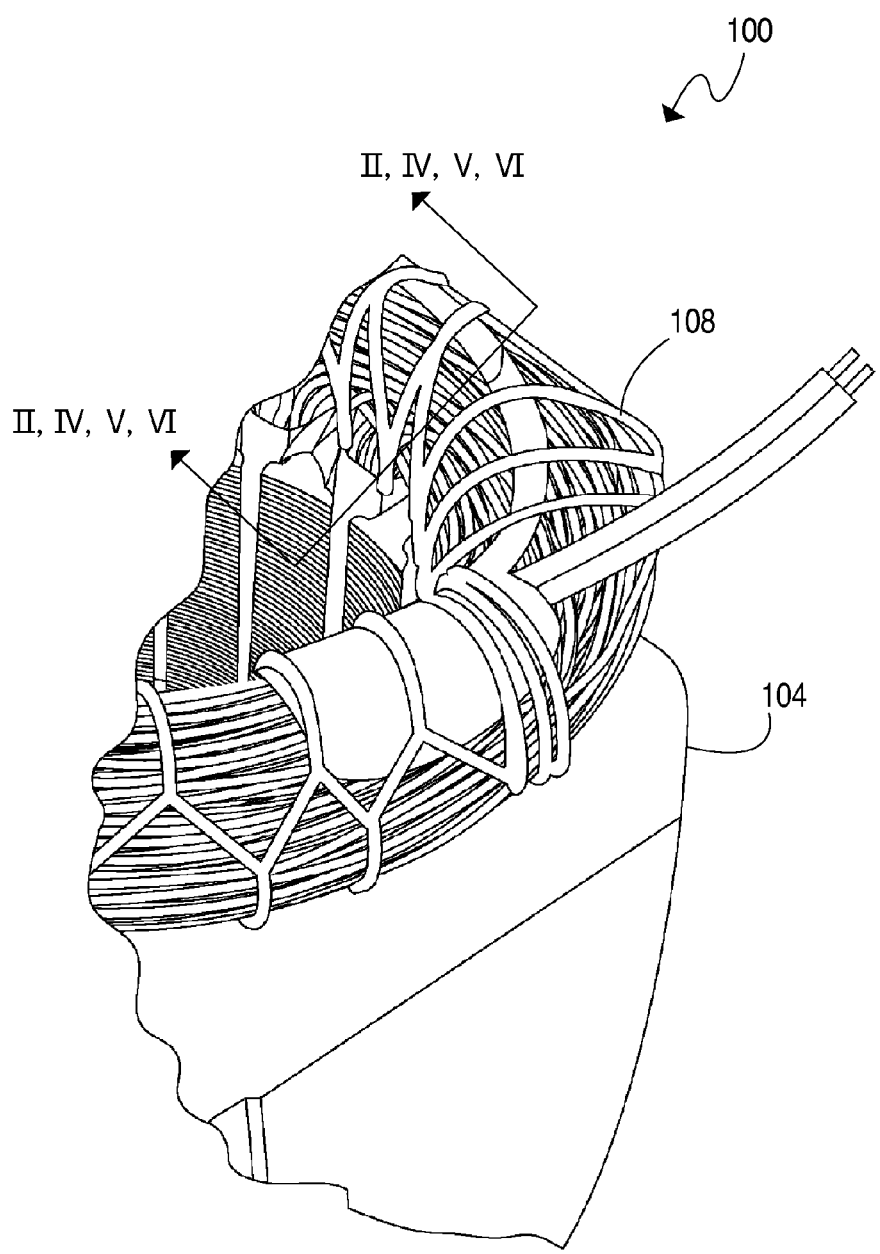
FIG. 1 depicts a perspective view of a stator core and a stator winding of an electrical motor.
Figure 8:
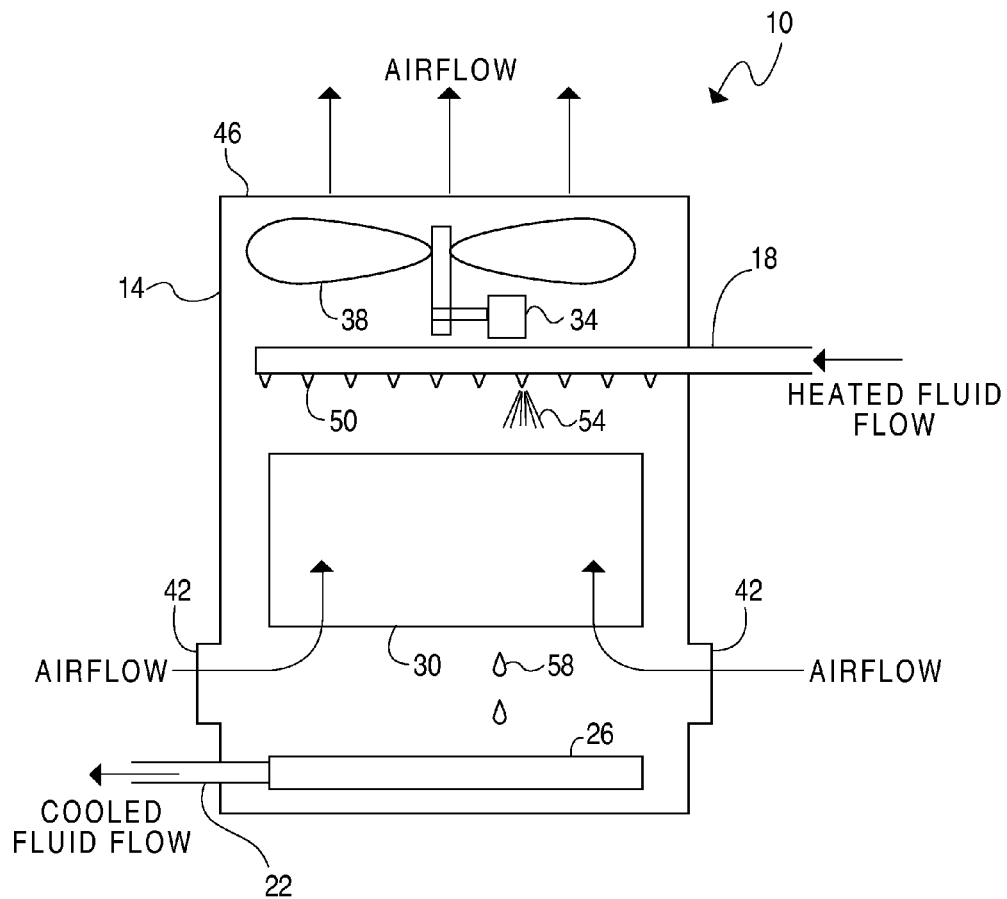
FIG. 8 depicts a prior art cooling tower suitable to receive the electrical motor described herein.

As shown in FIG. 1, an electrical motor 100 includes a stator core 104 and a stator winding 108. The stator winding 108 is wrapped about the stator core 104 and develops a rotating magnetic field in response to being energized with an alternating current energy source. A rotor (not illustrated) of the motor 100 rotates in response to the magnetic field generated by the stator winding 108. The electrical motor 100 may be operatively configured to rotate a fan associated with a cooling tower in order to generate airflow through the cooling tower. The airflow assists in evaporating and cooling a working fluid, usually water, of the cooling tower. A coupler or other mounting device may connect the electrical motor 100 to a region within a chamber of the cooling tower, as shown in FIG. 8. Alternatively, the coupler may connect the electrical motor 100 to a region outside of the chamber and a transmission may couple the electrical motor to the fan. Suitable transmissions include belts, chains, drive shafts, and the like. In both mounting positions, the cooling tower exposes the electrical motor 100 to a damp operating environment, which may have a humidity of up to one hundred percent. To protect the stator winding 108 from the damp and humid operating environment, an epoxy material 128 encapsulates the stator winding, as shown in FIGS. 2-6, but not shown in FIG. 1.

Figure 2:
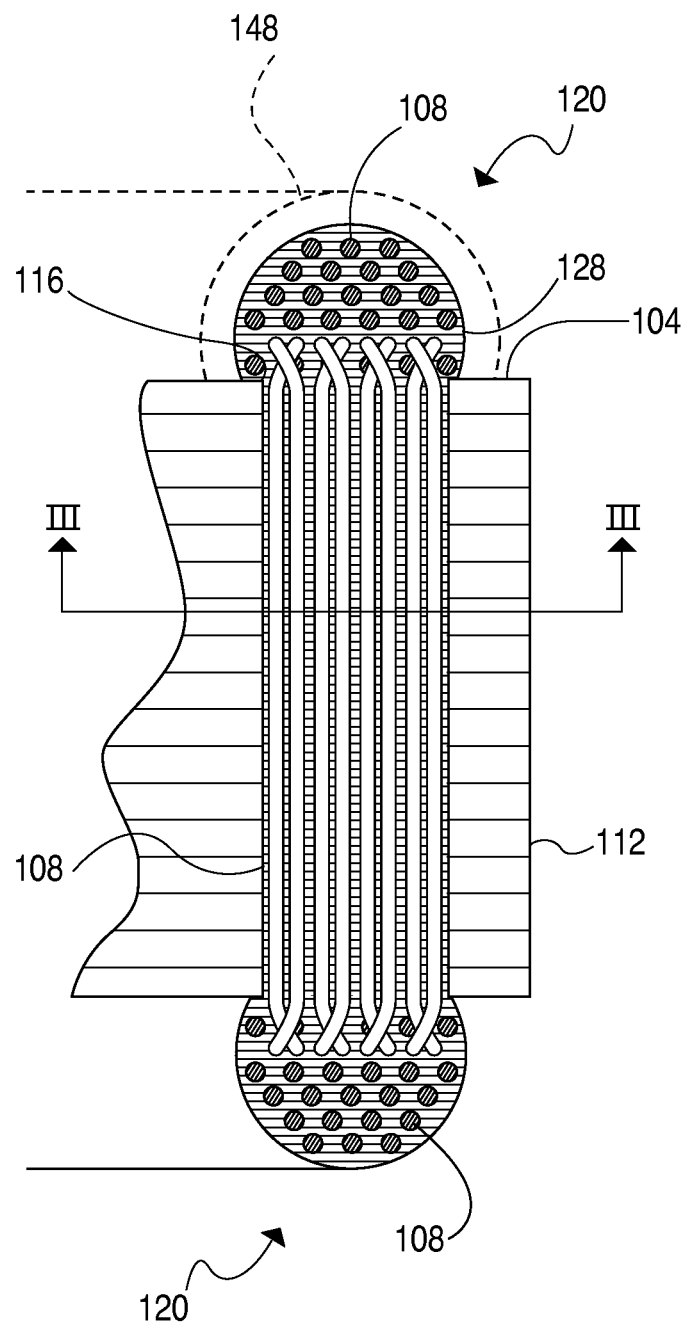
FIG. 2 depicts a side cross sectional view of the stator core and the stator winding taken along line II-II of FIG. 1, an epoxy fills a slot of the stator core and encapsulates end turns of the stator winding.
Figure 3:
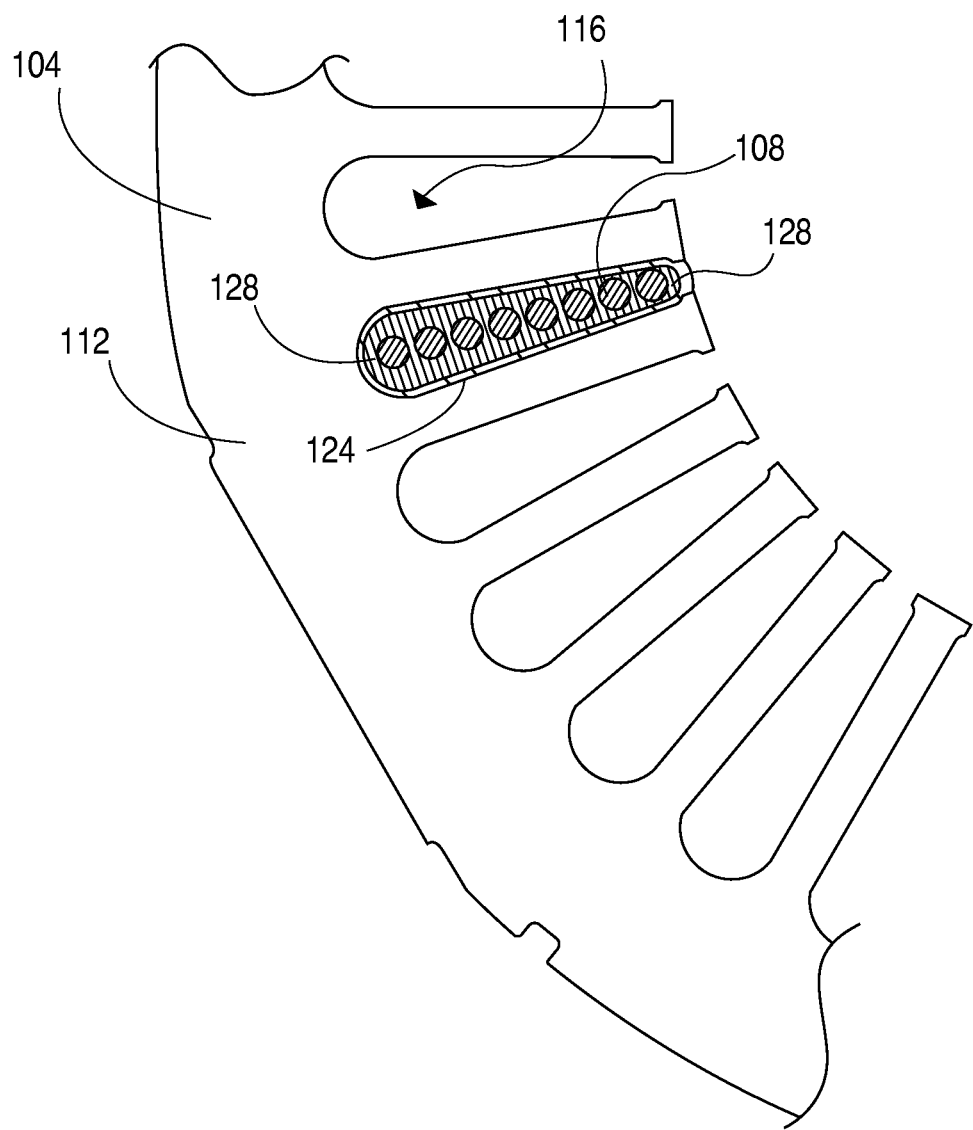
FIG. 3 depicts a top cross sectional view of the stator core and the stator winding taken along line III-III of FIG. 2.

Referring to FIGS. 1-3, the stator core 104 includes laminations 112 having slots 116 through which segments of the stator winding 108 extend. As shown in FIG. 1, the stator winding 108 may extend numerous times through each slot 116; however, for clarity, FIGS. 2 and 3 illustrate only a limited number of segments of the stator winding within each slot. The laminations 112 are stacked to align the slots 116 and to form longitudinally extending channels through the stator core 104. The laminations 112 are formed from metal or a metallic alloy and may be coated with an electrically insulating material to prevent conduction between the stator winding 108 and the stator core 104. As shown in FIG. 1, approximately fifty to two hundred laminations 112 may form the stator core 104; however, for clarity, FIG. 2 illustrates fewer laminations. The stator core 104 may be formed using any suitable number of laminations 112, as determined by the design parameters of the electrical motor 100.

As shown in FIGS. 1 and 2, the stator winding 108 includes end turn portions 120, at the top and bottom of the stator core 104. The end turn portions 120 include segments of the stator winding 108, which exit a first slot 116, travel a circumferential distance along an end of the stator core 104, and then enter a second slot. Although the end turns 120 are wrapped tightly to minimize their volume, air spaces may exist between each segment.

As shown in the embodiment of FIG. 3, the electrical motor 100 may include an insulating material 124 surrounding the segments of the stator winding 108 within the slot 116. Suitable insulating materials include paper, fiberglass, and other insulators. The insulating material 124 may be positioned against the perimeter of the slot 116 such that a space exists between the insulating material and the segments of the stator winding 108 within the slot, as shown in FIG. 3. The insulting material 124 insulates the stator winding 108 from the stator core 104. To provide further insulation, an electrically insulating enamel (not illustrated) may coat the stator winding 108 to insulate each segment of the stator winding from each other segment and from the stator core 104. The enamel is generally applied to the stator winding 108 before the stator winding is wound about the stator core 104.

As shown in FIGS. 2 and 3, the epoxy 128 encapsulates the stator winding 108 of the electrical motor 100 and fills the portions of the slots unoccupied by the stator winding. The epoxy 128 isolates the stator winding 108 from the damp and humid environment of the cooling tower, to prevent the stator winding from corroding, oxidizing, degrading, or otherwise becoming moisture damaged. The epoxy 128 may encapsulate all or a portion of the stator winding 108 of any type of electrical motor 100 including a totally enclosed air over electrical motor. The epoxy 128 bonds to the stator core 104 and the stator winding 108 to stabilize the position of the stator winding relative to the stator core.

The epoxy 128 is formed from a resin and a hardener. The resin may be a viscous liquid and the hardener may be a low viscosity catalyst. The hardener is mixed with the resin to activate the epoxy 128. The epoxy 128 begins to cure immediately after mixing the hardener with the resin. The epoxy 128, even when fully cured, may retain a degree of flexibility to enable the epoxy to dampen vibrations imparted upon the stator core 104 and stator winding 108 without breaking or cracking. The electrical properties of the stator winding 108 and the stator core 104 are unaffected by the epoxy 128, which is electrically inert.

In one embodiment the epoxy 128 may be a two component low temperature epoxy resin system, such as Epoxylite 230, which is manufactured by Elantas PDG, Inc. of St. Louis, Mo., United States. Epoxylite 230 may be mixed one hundred parts resin to twenty parts catalyst by weight and cures in twenty minutes at fifty-five degrees Celsius. The resin of the Epoxylite 230 weighs 9.8 pounds per gallon and has a viscosity at twenty-five degrees Celsius of approximately 10,500-13,500 centipoise. The catalyst of the Epoxylite 230 weight 8.6 pounds per gallon and has a viscosity at twenty-five degrees Celsius of one hundred to five hundred centipoise. After curing for twenty minutes at fifty-five degrees Celsius the Epoxylite 230 has a heat distortion temperature of fifty degrees Celsius, a Shore® Durometer Hardness of eighty-five as measured on the Shore D scale, and a tensile strength of nine thousand pounds per square inch. The Epoxylite 230 has a dielectric strength of five hundred volts per mil and a film thickness of 125 mils in which one mil equals one-thousandth of an inch.

As shown in the embodiment of FIG. 2, the epoxy 128 encapsulates completely the stator winding 108 including the end turns 120 and the segments of the stator winding within the slots 116. Accordingly, the damp and humid operating environment of the cooling tower acts upon the epoxy directly, which is generally not susceptible to moisture damage. Stated differently, no portion of the stator winding 108 is exposed to the damp and humid operating environment of the cooling tower.

Figure 4:
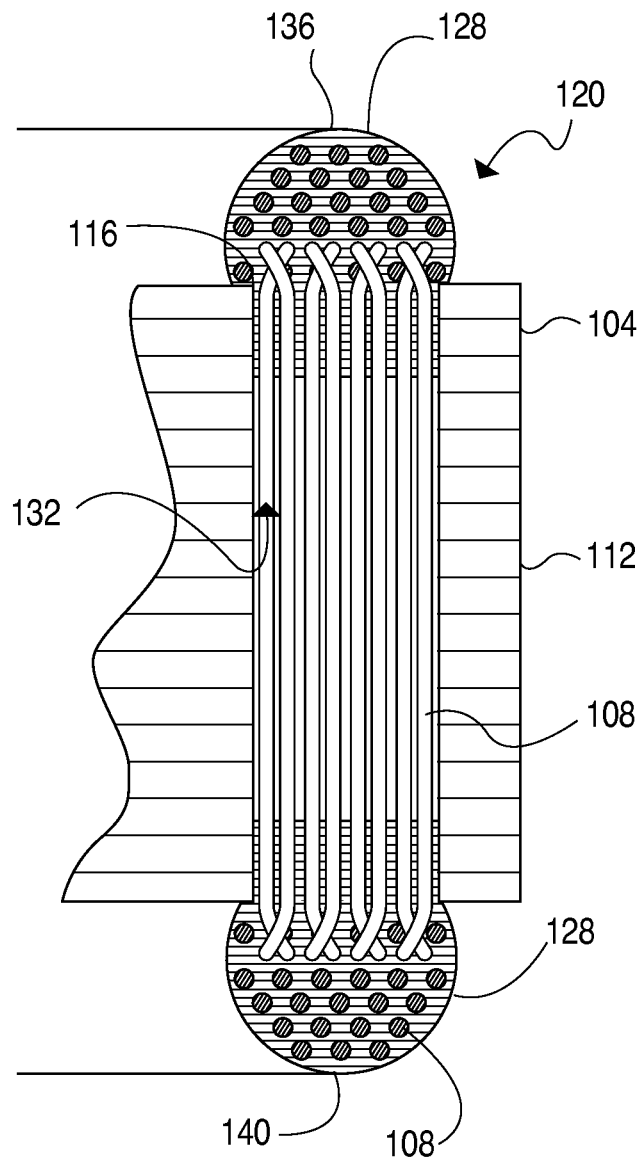
FIG. 4 depicts a side cross sectional view of the stator core and the stator winding taken along line IV-IV of FIG. 1, an epoxy fills partially a slot of the stator core and encapsulates end turns of the stator winding.

In the embodiment of FIG. 4, the epoxy 128 encapsulates the end turns 120 of the stator winding 108, but extends only a portion of the way through the slots 116, such that the portions of the stator winding within the slots do not contact the epoxy. In this embodiment, the epoxy 128 bonds to the stator core 104 and seals the air-filled region 132 between the upper epoxy portion 136 and the lower epoxy portion 140 to prevent the damp and humid operating environment of the cooling tower from infiltrating the air space 132. Additionally, the laminations 112 are pressed together with sufficient pressure to prevent moisture and water vapor from seeping into the air space 132. Therefore, the entire stator winding 108 is isolated from the operating environment, but the epoxy 128 encapsulates only a portion of the stator winding.

Figure 5:
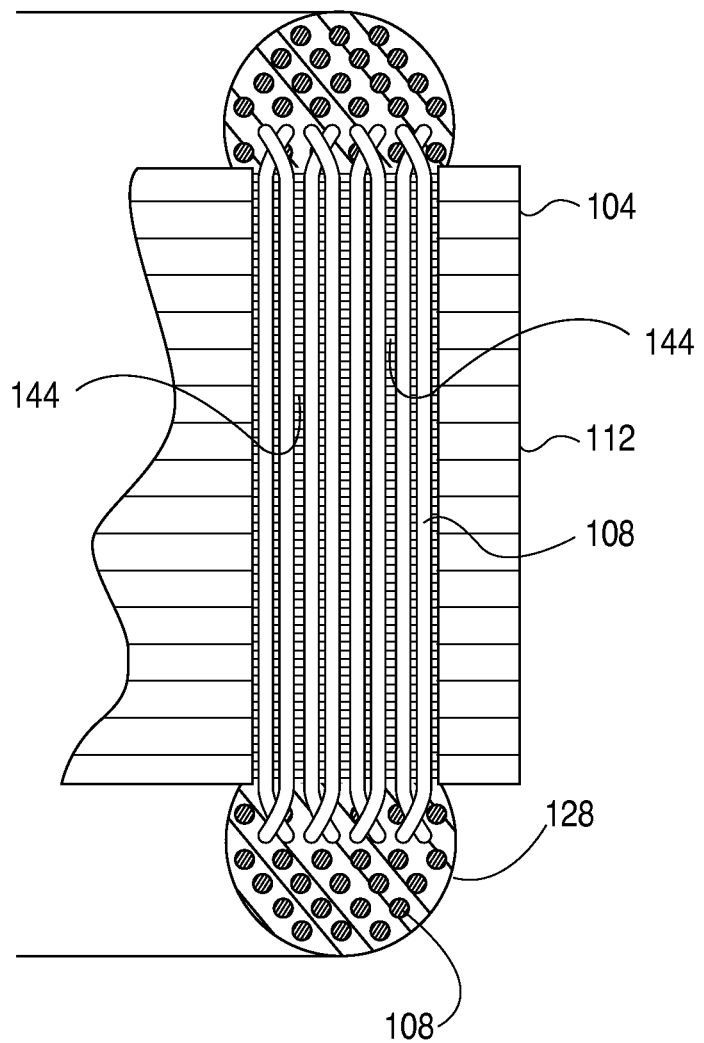
FIG. 5 depicts a side cross sectional view of the stator core and the stator winding taken along line V-V of FIG. 1, a potting material fills a slot of the stator core and an epoxy encapsulates end turns of the stator winding.
Figure 6:
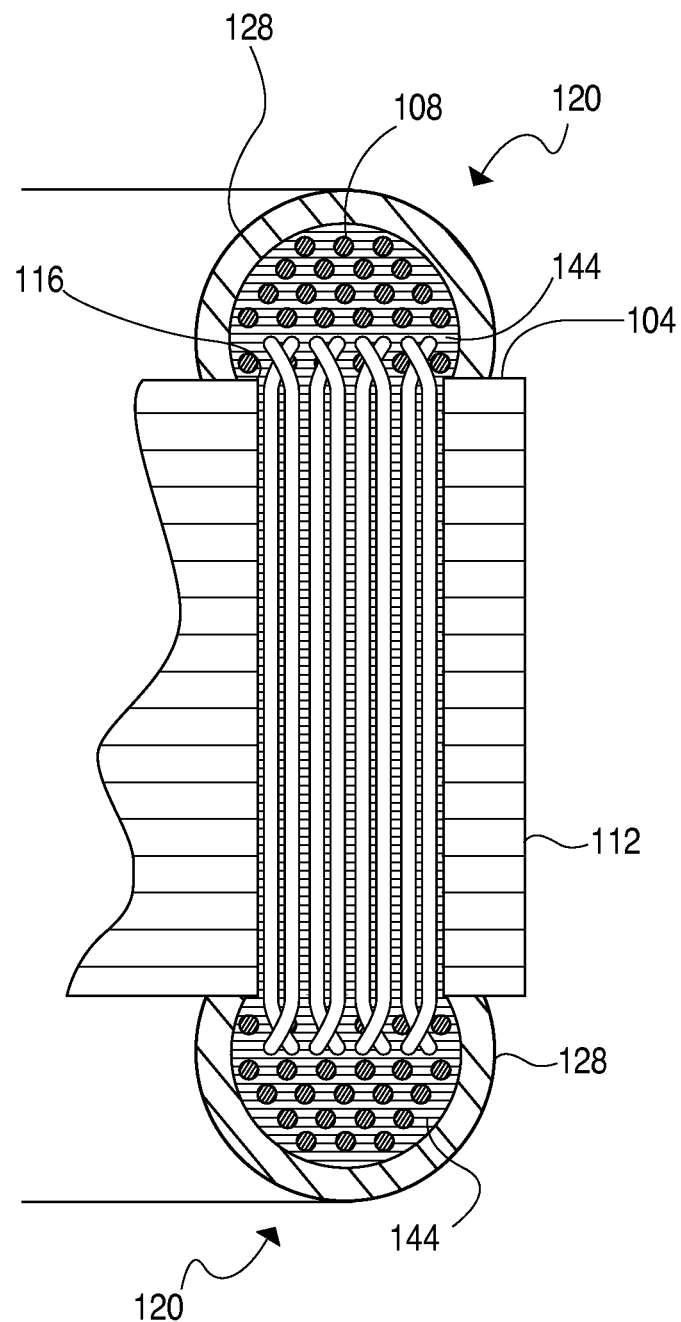
FIG. 6 depicts a side cross sectional view of the stator core and the stator winding taken along line VI-VI of FIG. 1, a potting material fills a slot of the stator core and encapsulates end turns of the stator winding, and an epoxy encapsulates a portion of the potting material.

As shown in the embodiment of FIG. 5, potting material 144 surrounds the portion of the stator winding 108 within the slots 116 of the stator core 104. The potting material 144 may be any potting material known to those of ordinary skill in the art, including thermoplastic and resinous potting materials. In general, the potting material 144 is applied to the stator winding 108 and stator core 104 in a vacuum impregnation process in which vacuum draws the viscous potting material into the slots 116; however, the potting material may be applied in any method known to those of ordinary skill in the art. The epoxy 128 may be applied to the stator winding 108 and the stator core 104 after the application of the potting material 144. The epoxy 128 bonds to the potting material 144 to form a fluid and air impervious seal therebetween. In general, the epoxy 128 encapsulates the portion(s) of the stator winding 108 unencapsulated by the potting material 144. For example, in addition to surrounding the portion of the stator winding 108 within the slots 116, the potting material 144 may surround at least a portion of the end turns 120. In such an embodiment, the epoxy 128 is applied over the potting material 144 to encapsulate any portion of the stator winding unencapsulated by the potting material 144. For example, as shown in the embodiment of FIG. 6, the potting material 144 encapsulates the stator winding 108, and the epoxy 128 encapsulates the portion of the potting material, which encapsulates the end turns 120. Accordingly, the epoxy 128 bonds to the potting material 144 and the stator core 104 to protect the potting material 144 and the stator winding 108 from moisture damage.

Figure 7:
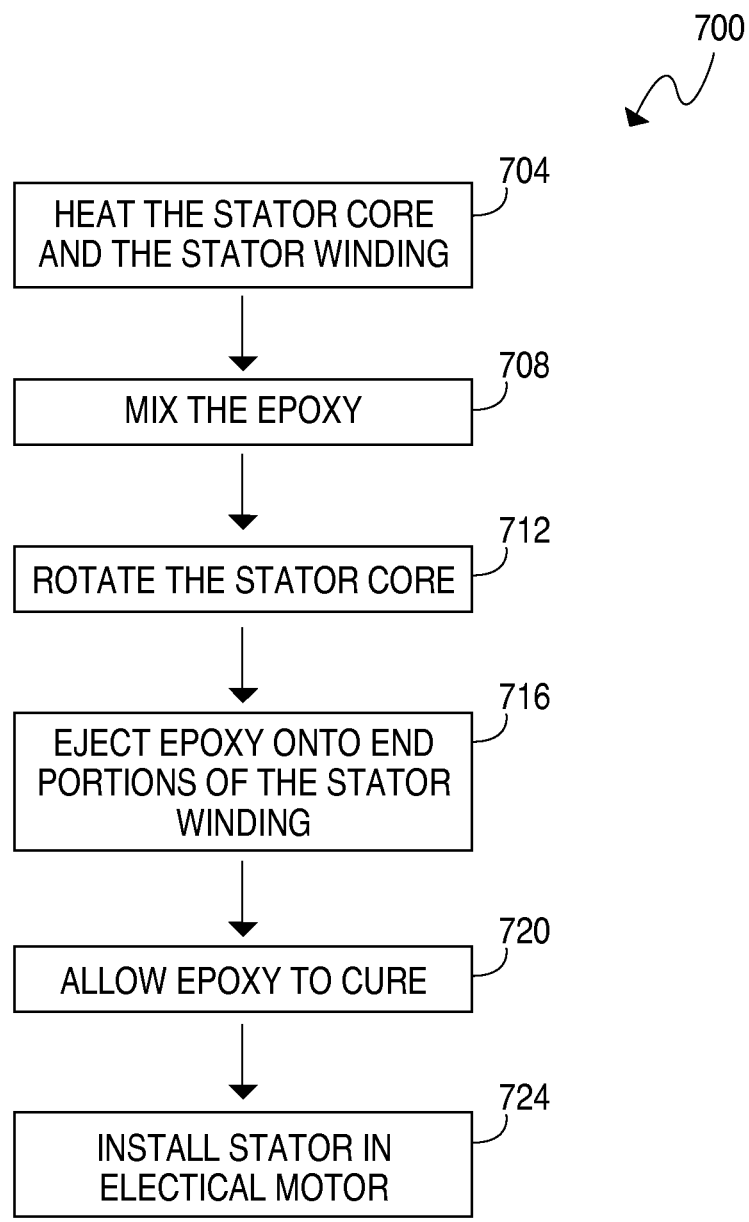
FIG. 7 depicts a flowchart, which illustrates a method of applying an epoxy to the electrical motor of FIG. 1.

The flowchart of FIG. 7 illustrates a method 700 of encapsulating the stator winding 108 of an electrical motor 100 to protect the stator winding from moisture damage. The method 700 begins with heating the stator core 104 and the stator winding 108 to a predetermined temperature (block 704). The predetermined temperature is selected based at least in part on the characteristics of the epoxy 128. Next or concurrently, the hardener of the epoxy 128 is mixed with the resin to activate the epoxy 128, which may cause the epoxy to begin to cure (block 708). The activated epoxy 128 is held within an ejection device, which includes a container for holding the epoxy and a nozzle through which a pump ejects the epoxy. The epoxy 128 has a viscosity suitable for ejection at room temperature.

Next, the stator core 104 having the stator winding 108 wound thereon is mounted for rotation about the longitudinal axis of the stator core (block 712). The stator core 104 may be configured to rotate such that the axis of rotation is generally horizontal. Alternatively, the stator core 104 may be configured to rotate with a skewed axis of rotation, which may assist in directing the flow of epoxy 128 to particular regions of the stator core, such as the slots 116. In some embodiments, the stator core 104 and stator winding 108 may be rotated as the stator core 104 and stator winding 108 are heated to the predetermined temperature. After the stator core 104 has begun to rotate the ejection device ejects the epoxy 128 onto one or both of the end turns 120 of the stator winding 108 (block 716). The ejection device applies the epoxy 128 to the stator winding 108 at atmospheric pressure without requiring placement of the stator core 104 and the stator winding in a vacuum chamber. The epoxy 128 may be applied over the electrically insulating enamel on the stator winding 108 without affecting the insulating properties of the enamel. The epoxy 128 infiltrates the air gaps between the segments of the stator winding 108 of the end turns 120 and capillary action draws the epoxy 128 into the slots 116 in the stator core 104. In particular, capillary action may draw epoxy 128 ejected on the end turn 120 located at the first end of the stator core 104 through the slots 116 to the end turn 120 at the second end of the stator core. Alternatively, the ejection device may apply epoxy 128 to both end turns 120 of the stator core 104 such that capillary action draws each portion of epoxy toward the longitudinal center of the stator core 104. The portions of epoxy 128 applied to opposite ends of the stator core 104 may contact each other within the slots 116 to form a continuous region of epoxy, as shown in FIG. 2, or each portion of epoxy may remain separate, as shown in FIG. 4. In each method of application, the elevated temperature of the stator core 104 and stator winding 108 enhances the capillary action of the epoxy 128. Conversely, the capillary action of the epoxy 128 may be reduced by cooling one or more of the epoxy, the stator core 104, and the stator winding 108.

The epoxy 128 may be applied to the end turns 120 in a desired thickness. As the epoxy 128 contacts the end turns 120, it begins to cure, which causes the viscosity of the epoxy to increase; thus, most of the epoxy 128 adheres to the end turns without falling from the stator winding 108. Because most of the epoxy 128 remains adhered to the end turns, the thickness of the resulting epoxy layer may be controlled. In particular, the thickness of the resultant epoxy layer is directly related to the length of a predetermined time period for which the ejection device applies the epoxy 128.

After the ejection device has applied a desired thickness of epoxy 128 to the end turns 120 and capillary action has drawn the epoxy into the slots 116, the epoxy continues to cure (block 720). Thereafter, the stator core 104 may be installed within the housing of an electrical motor (block 724).

The epoxy 128 differs substantially from protective varnishes and epoxy paints applied to the stator windings 108 of some electrical motors. It is known in the art to apply varnish and epoxy paint to the stator winding 108 of an electrical motor to protect the winding from a damp and humid operating environment; however, varnish and epoxy paint each form a thin and brittle layer upon the stator winding 108, which provides less protection than the epoxy 128. In particular, protective varnishes are typically applied to a stator winding through a process in which the stator core and the stator winding are dipped in a heated vat of the varnish and then are placed in a heat chamber to bake or cure the varnish. With each dip into the varnish, at least a portion of the previously applied varnish melts into the vat, making it difficult and time consuming to achieve a significant thickness of varnish on the stator winding. Similarly, developing a protective layer of epoxy paint on the stator winding is difficult because the relatively low viscosity of epoxy paint causes the paint to drip from the stator winding instead of adhering to the winding. Also, the time required for the epoxy paint to dry/cure between applications can adversely impact the number of stator winding produced. Furthermore, epoxy paint typically adheres only to the exterior portions of the stator winding 108, such as the end turns 120, and is not drawn into the slots 116 by capillary action. Therefore, portions of the stator winding, especially the portions of the stator winding within the slots, remain exposed to the damp and humid operating environment. Unlike varnish and epoxy paint, the epoxy 128 may be applied to the stator winding 108 with a controlled thickness and within a reasonable time period, due to the cure rate and the adhesion properties of the epoxy. The epoxy 118 exhibits flexibility after it cures and therefore is not as easily chipped or cracked as varnish or epoxy paints. Furthermore, the epoxy 128 is less expensive to apply because it does not require application within a vacuum chamber like some varnishes and epoxy paints.

The method 700 causes the ejection device to apply the epoxy 128 to the stator winding with a coating thicker than the coating associated with wire binding operations. Specifically, wire binding refers to fixing the position of the stator winding with respect to the stator core. Only a relatively small amount of epoxy is required for wire binding, and the epoxy leaves a portion of the stator winding exposed to the atmosphere because the wire binding operation is not performed to isolate the stator winding from a damp and humid operating atmosphere. Furthermore, the wire binding operating is not required to fill completely the slots of the stator core with the epoxy, as shown in FIGS. 2 and 3. In the method 700, a thick layer of epoxy is applied to the stator winding, until no portion of the stator winding is exposed to the atmosphere. Additionally, as shown by the dashed line 148 in FIG. 2, the ejection device may continue to apply the epoxy 128 well after the winding 108 is completely isolated such that the epoxy extends from the outer most segment of end turns 120 for approximately five to fifteen millimeters. Accordingly, the method 700 applies a much greater amount of epoxy 128 to the stator winding 108 than is applied to the stator winding for wire binding purposes.

In operation, the electrical motor 100 rotates a fan within a chamber of a cooling tower, such as the cooling tower 10 of FIG. 8. The cooling tower 10 causes a fluid, usually water, to evaporate and form a damp and humid environment. The epoxy 128 isolates the stator winding 108 from the damp and humid environment to protect the stator winding 108 from moisture damage.

As described above, the epoxy 128 may be applied to a totally enclosed air over motor, which is a type of enclosed motor. Enclosed motors include a housing, which fully or partially isolates the components within the housing from the atmosphere. A totally enclosed air over motor includes a housing which, attempts to isolate fully the components positioned within the housing from the atmosphere surrounding the housing; nonetheless, the epoxy 128 may be required to account for deficiencies in the isolation provided by the motor housing. An enclosed motor may be distinguished from an open motor, which allows airflow from the atmosphere to contact the stator core and the stator winding. Open motors are commonly used in the construction of automobile alternators, while enclosed motors are frequently used to drive the fan of a cooling tower.

Those skilled in the art will recognize that numerous modifications can be made to the specific implementations described above. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. An electrical motor comprising:
    a stator core having a plurality of laminations that form a plurality of slots in the stator core, the laminations being pressed together to form a barrier to moisture entering an air space within each slot formed by the laminations;
    a stator winding configured about the stator core, the stator winding extending through the slots in the laminations to form end portions, each end portion extending from one slot to another slot in the stator core; and
    an epoxy encapsulating each end portion of the stator winding, the epoxy encapsulating each end portion of the stator winding extends into a portion of the air space in each slot in the stator core and bonds to the stator core to seal an air-filled region between the epoxy encapsulating each end portion of the stator winding.

2. The electrical motor of claim 1, wherein the stator core and the stator winding are configured to operate within a totally enclosed air over electrical motor.

3. The electrical motor of claim 1 wherein the epoxy is configured to isolate the stator winding from a relative humidity of approximately one hundred percent.

4. The electrical motor of claim 1 further comprising:
    a potting material covering a portion of the stator winding positioned within the stator core, the potting material extending between the epoxy at the openings at each end of each slot.

* * * * *